United States Patent
Feng et al.

(10) Patent No.: US 8,435,478 B2
(45) Date of Patent: May 7, 2013

(54) ENHANCEMENT OF SYNGAS PRODUCTION IN COAL GASIFICATION WITH $CO_2$ CONVERSION UNDER PLASMA CONDITIONS

(75) Inventors: Maoqi Feng, San Antonio, TX (US); Francis Yu Chang Huang, San Antonio, TX (US); Richard L. Johnson, San Marcos, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/015,206

(22) Filed: Jan. 27, 2011

(65) Prior Publication Data

US 2012/0193580 A1    Aug. 2, 2012

(51) Int. Cl.
*C01B 31/18* (2006.01)

(52) U.S. Cl.
USPC .............. 423/418.2; 48/198.2; 48/210

(58) Field of Classification Search ........... 423/418.2; 48/210
See application file for complete search history.

(56) References Cited

U.S. PATENT DOCUMENTS

| | | | |
|---|---|---|---|
| 4,202,757 A | | 5/1980 | Amendola |
| 4,229,184 A | * | 10/1980 | Gregg .................. 48/62 R |
| 5,071,540 A | | 12/1991 | Culross et al. |
| 5,783,065 A | | 7/1998 | Wiser et al. |
| 6,946,053 B2 | * | 9/2005 | Donohoe ............... 156/345.44 |
| 2009/0152171 A1 | | 6/2009 | Zhang et al. |
| 2010/0180805 A1 | | 7/2010 | Cheiky |

OTHER PUBLICATIONS

He, et al. "Mechanism of coal gasification in a steam medium under arc plasma conditions". Plasma Sources Sci. Technol. 13 (2004) 446-453 Jun. 2004.*
He, et al. "The formation mechanism of CO2 and its conversion in the process of coal gasification under arc plasma conditions." Plasma Sources Science and Technology vol. 15, pp. 246-252 (2006).*
Liu, et al. "Non-Thermal Plasma approaches in CO2 Utilization" Fuel Processing Technology, vol. 58, Issues 2-3. Mar. 1999, pp. 119-134.*
Osamu Kamei, Kaoru Onoe, Wataru Marushima, Tatsuaki Yamaguchi, Brown coal conversion by microwave plasma reactions under successive supply of methane, Fuel, vol. 77, Issue 13, Oct. 1998, pp. 1503-1506, ISSN 0016-2361, 10.1016/S0016-2361(98)00055-6.*
Larson, et al., "Synthetic fuel production by indirect coal liquefaction," Energy for Sustainable Development, vol. VII, No. 4, Dec. 2003.
Pei, et al., "Experimental research on catalysts and their catalytic mechanism for hydrogen production by gasification of peanut shell in supercritical water," Frontiers of Energy and Power Engineering in China vol. 1, No. 4, 451-456.
Wood, et al., "Coal Liquefaction in Coiled Tube Reactors," Ind. Eng. Chem. Process Des. Dev., 1976, 15 (1), pp. 144-149.

(Continued)

*Primary Examiner* — Daniel C McCracken
*Assistant Examiner* — Richard M Rump
(74) *Attorney, Agent, or Firm* — Grossman, Tucker et al.

(57) ABSTRACT

A process and apparatus for enhancement of syngas production (CO and $H_2$) of a carbon based feedstock with $CO_2$ conversion, which utilized $CO_2$ as an oxygen resource and converts $CO_2$ to CO through chemical reactions. The process includes a thermal plasma reactor and optionally a nonthermal plasma reactor.

17 Claims, 3 Drawing Sheets

OTHER PUBLICATIONS

Kawa, et al., "Hydrogenation of Asphaltene from Coal using Halide Catalysts," Symposium on Hydrogen Processing of Solid and Liquid Fuels Presented Before the Division of Petroleum Chemistry, Inc., American Chemical Society, Chicago Meeting, Sep. 13-18, 1970. pp. A23-A28.

Zielke, et al., "Moltem Zinc Halide Catalysts for Hydrocracking Coal Extract and Coal," Ind. Eng. Chem. Process Des. Dev., 1966, 5 (2), pp. 158-164.

Grens II, et al., "Coal Liquefaction Catalysis by Zinc Chloride Melts in Combination with Organic Solvents," Ind. Eng. Chem. Process Des. Dev., 1980, 19 (3), pp. 396-401.

Chen, et al., "Temperature and Velocity Measurements in Turbulent Argon-Helium Plasma Jets," dated Aug. 1991, available at 134.147.148.178/ispcdocs/ispc10/content/10/10-1.2-12.pdf (6 pages).

Czernichowski, et al., "Cold-Plasma Reduction of Flue-Gas SOx TO Elemental Sulfur," International Union of Pure and Applied Chemistry, 11th International Symposium on Plasma Chemistry, England, Aug. 22-27, 1993 Symposium Proceedings vol. 2, pp. 674-679; also available online at 134.147.148.178/ispcdocs/ispc11/content/11/11-0674.pdf.

Ergun, "Kinetics of the Reaction of Carbon Dioxide with Carbon," J. Phys. Chem., 1956, 60 (4), pp. 480-485.

Futamura, et al., "Synthesis Gas Production from CO2 and H2O with Nonthermal Plasma," Studies in Surface Science and Catalysis, vol. 153, 2004, pp. 119-124.

He, et al., "The formation mechanism of CO2 and its conversion in the process of coal gasification under arc plasma conditions," Plasma Sources Science and Technology vol. 15, pp. 246-252. (2006).

Kalinenko, et al., "Pulverized Coal Plasma Gasification," Plasma Chemistry and Plasma Processing vol. 13, No. 1, 1993, pp. 141-167.

Liu, "Non-thermal plasma approaches in CO2 Utilization," Fuel Processing Technology, vol. 58, Issues 2-3, Mar. 1999, pp. 119-134.

Mizuno, et al., "A Method for the Removal of sulfur Dioxide from Exhaust Gas Utilizing Pulse Streamer Corona for Electron Energization," IEEE Transactions on Industry Applications, vol. 1A-22, No. 3, May/Junme 1986, pp. 516-522.

Morova, et al., "Plasma Technologies for Reducing CO2 Emissions from Combustion Exhaust with Toxic Admixtures to Utilisable Products," Journal of Thermal Analysis and Calorimetry, vol. 61 (2000) 273-287.

Poncin-Epaillard, et al., "Study of the Interactions Between Carbone Dioxide Plasma and Polypropylene," ISPC-14, Prague, Czech Republic, Aug. 2-6, 1999, Edited by M. Hrabovsky, p. 1889-1894.

Qiu, et al., "Coal gasification in steam and air medium under plasma conditions: a preliminary study," Fuel Processing Technology, vol. 85, Issues 8-10, Jul. 15, 2004, pp. 969-982.

Smith, et al., "Induction-coupled Plasma Energy Recycle and Conversion (PERC) of Military Waste Streams," 12th International Symposium on Plasma Chemistry and Plasma Proceedings vol. II, Aug. 21-25, 1995, pp. 1057-1062.

Smith, et al., "Reactive Plasma Spray Forming of Nitride/Nitrogen Composite Materials," 11th International Symposium on Plasma Chemistry. vol. 1; Loughborough, Leicestershire; United Kingdom; Aug. 22-27, 1993. pp. 139-144.

Wang, et al., "A Feasibility Study of Synthesis of Oxygenates Directly from Methane and Carbon Dioxide Using Dielectric-barrier Discharges," Studies in Surface Science and Catalysis, vol. 153, 2004, pp. 109-118.

U.S. Office Action issued Aug. 29, 2012 in U.S. Appl. No. 13/976,577 (11 pgs).

\* cited by examiner

ENHANCEMENT OF SYNGAS PRODUCTION IN COAL GASIFICATION WITH CO₂ CONVERSION UNDER PLASMA CONDITIONS

STATEMENT REGARDING FEDERALLY SPONSORED RESEARCH OR DEVELOPMENT

This invention was made with United States Government support under Contract No. HR0011-09-C-0094 awarded by the U.S. Defense Advanced Research Projects Agency. The Government has certain rights in this invention.

FIELD OF THE INVENTION

The present disclosure is directed at the enhancement of syngas production in coal gasification. More specifically, the present disclosure relates to a carbon dioxide reduction process which utilizes carbon dioxide as an oxygen source and converts carbon dioxide to carbon monoxide in a plasma coal gasification process. The process utilizes a thermal plasma reactor for syngas production and carbon dioxide conversion.

BACKGROUND

Coal and other fossil fuels will remain critical fuels for the U.S. and some other countries. The development and deployment of lower $CO_2$ emissions technologies will be a key in delivering clean energy and climate control associated with fossil fuel use. In the recent years, global efforts in carbon dioxide ($CO_2$) capture and storage (CCS) are gaining importance in significant greenhouse gas emission reductions from the use of fossil energy. Carbon dioxide capture-enabling technologies in coal-fired energy area include integrated coal gasification combined cycle (IGCC), oxy-fuel combustion, and post-combustion $CO_2$ capture. These technologies are at different stages of development.

SUMMARY

A process for carbon dioxide conversion comprising supplying a thermal plasma reactor and introducing into the reactor a carbon based feedstock (C) and carbon dioxide ($CO_2$) wherein the thermal plasma reactor is at a temperature sufficient to convert the carbon based feedstock to carbon monoxide according to the following reaction:

$$C+CO_2 \leftrightharpoons 2CO$$

wherein the carbon based feedstock may be in the size range of 50 μm to 150 μm, the thermal plasma reactor provides a temperature gradient and the $CO_2$ is introduced into the reactor at a flow rate of 1.0 L/min to 10.0 L/min.

In another embodiment, the present disclosure again relates to a process for carbon dioxide conversion comprising supplying a thermal plasma reactor and introducing into the reactor a carbon based feedstock (C) and carbon dioxide ($CO_2$) wherein the thermal plasma reactor is at a temperature sufficient to convert the carbon based feedstock to an output gas comprising carbon monoxide according to the following reaction:

$$C+CO_2 \leftrightharpoons 2CO$$

wherein the carbon based feedstock is in the size range of 50 μm to 150 μm, the thermal plasma reactor provides a temperature gradient and said $CO_2$ is introduced into said reactor at a flow rate of 1.0 L/min to 10.0 L/min. The output gases of the thermal plasma reactor may then be introduced to a nonthermal plasma reactor wherein said nonthermal plasma reactor provides conversion of carbon dioxide to carbon monoxide according to the equation:

$$CO_2 + H_2 \rightarrow CO + H_2O$$

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

The present disclosure relates to a carbon dioxide emission reduction process which may utilize carbon dioxide ($CO_2$) as an oxygen resource in the presence of a carbon based feedstock and convert carbon dioxide to carbon monoxide (CO) in a plasma gasification process. The process may utilize a thermal plasma reactor as the primary syngas (carbon monoxide and/or hydrogen) production. It may then optionally employ a nonthermal plasma reactor for further carbon dioxide conversion which may take place in the presence of other reactants.

Figure 1:
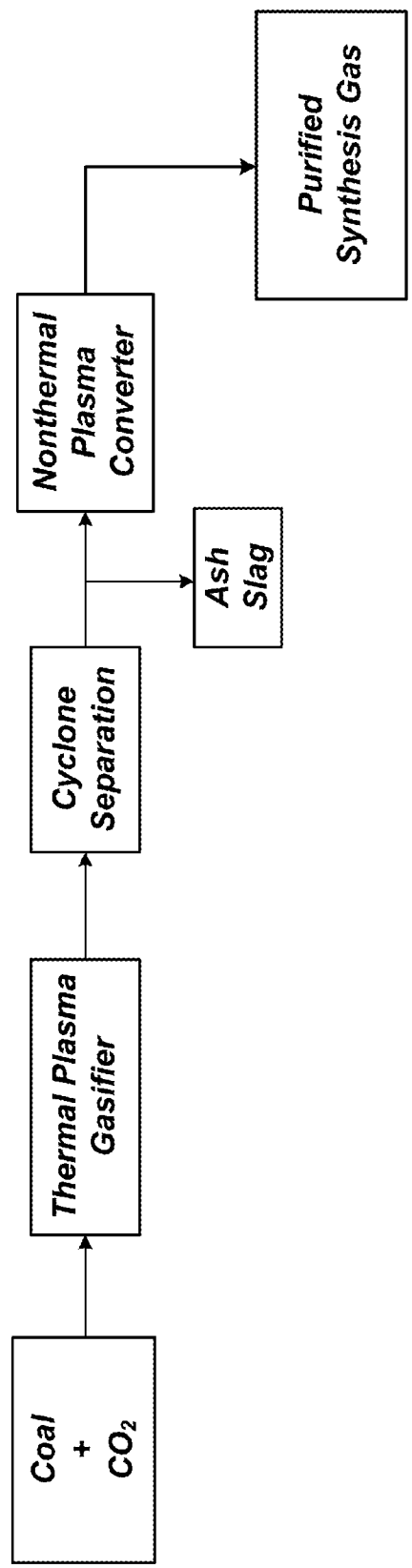
FIG. 1 illustrates a process flow diagram illustrating the use of carbon dioxide as an oxygen resource to convert $CO_2$ to CO.

Attention is directed to FIG. 1 which provides an initial process flow diagram. As can be seen, a carbon based feedstock such as coal and $CO_2$ may now be configured for introduction into a thermal plasma gasifier. Accordingly, the process herein may utilize a relatively wide range of carbon based feedstocks which may include coal, oils, petroleum coke, refinery residuals and/or wasters, hydrocarbon contaminated solids, biomass and agricultural wasters. With regards to the preferable use of coal sources, one may preferably employ lignite, sub-bituminous, bituminous, and/or anthracite type material. The carbon based feedstock is preferably introduced into the thermal plasma gasifier in particulate form, where the particulate may be in the size range of about 100 mesh to 300 mesh (50 μm to 150 μm). In addition, one may preferably introduce the carbon based feedstock into the thermal plasma gasifier at a rate of 5.0 g/min to 20 g/min and at all 1.0 g/min increments therein. For example, one may introduce the coal at a rate of 6.0 g/min, 7.0 g/min, 8.0 g/min, 9.0 g/min, 10.0 g/min, up to the level of 20.0 g/min.

The $CO_2$ for introduction into the thermal plasma gasifier may be obtained from a variety of sources and may preferably be recycled $CO_2$ that may become available from any downstream operation. The $CO_2$ may be introduced on its own as the delivery gas and optionally in the presence of other gases such as air and/or oxygen. The $CO_2$ may preferably account for 50% or more of the gas volume flow. Accordingly, it will be appreciated herein that the use of $CO_2$ as the carbon based feedstock delivery gas now serves as an oxygen carrier for the ensuing conversion to CO by a reaction with the carbon feedstock (coal) in the thermal plasma gasifier by a reverse Boudouard reaction. The Boudouard reaction may be understood as the redox reaction of a chemical equilibrium mixture of CO and $CO_2$ at a given temperature. The reverse Boudouard reaction may now be configured to take place on the surface of the gasified carbon based feedstock within the thermal plasma gasifier and may be represented as follows:

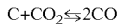

More specifically, the reaction of $CO_2$ with carbon involves the detaching of an oxygen atom from $CO_2$ at an active site on the surface of the gasified carbon. the reverse Boudouard reaction may be written as follows:

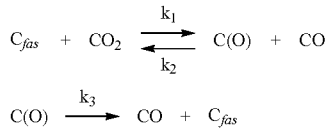

In the above, the first step may be understood as the dissociation of $CO_2$ at a carbon free active site ($C_{fas}$) releasing CO and forming an oxidized surface complex [C(O)]. In the second step the carbon-oxygen surface complex may subsequently produce CO and a new carbon free active site. The first step is relatively slow compared with the second step, so the second step may be treated as an irreversible reaction. Accordingly, desorption of the carbon-oxygen surface complex is the rate limiting step. A reaction rate equation that reflects this mechanism may be written as follows:

$$R = k_1 p_{CO2}/(1+(k_1/k_2)p_{CO2}+(k_2/k_3)p_{CO})$$

where p is the partial pressure for each component and $k_1$, $k_2$ and $k_3$ are the rate constants for the reactions noted above.

With respect to the introduction of $CO_2$ to the thermal plasma gasifier, the $CO_2$ flow rate may be configured herein to preferably provide a $CO_2$ concentration within the thermal plasma gasifier of 5.0 vol. % to 40 vol. %. More preferably, the $CO_2$ concentration within the thermal plasma gasifier may be in the range of 20 vol. % to 30 vol. %. The $CO_2$ flow rate which may be utilized may be in the range of 1.0 L/min to 10.0 L/min. It should also be noted that one may utilize the $CO_2$ as the delivery gas optionally in conjunction with other gases, such as air or oxygen. In such manner, one may include with the $CO_2$ delivery gas air and/or oxygen, where as noted above, the $CO_2$ volume flow may be 50% or greater and the air and/or oxygen (if utilized) account for any remaining volume flow. Within such parameters, the air and/or oxygen may optionally be present at a flow rate of 0.1-2.5 L/min, more preferably 0.5-1.5 L/min.

Figure 2:
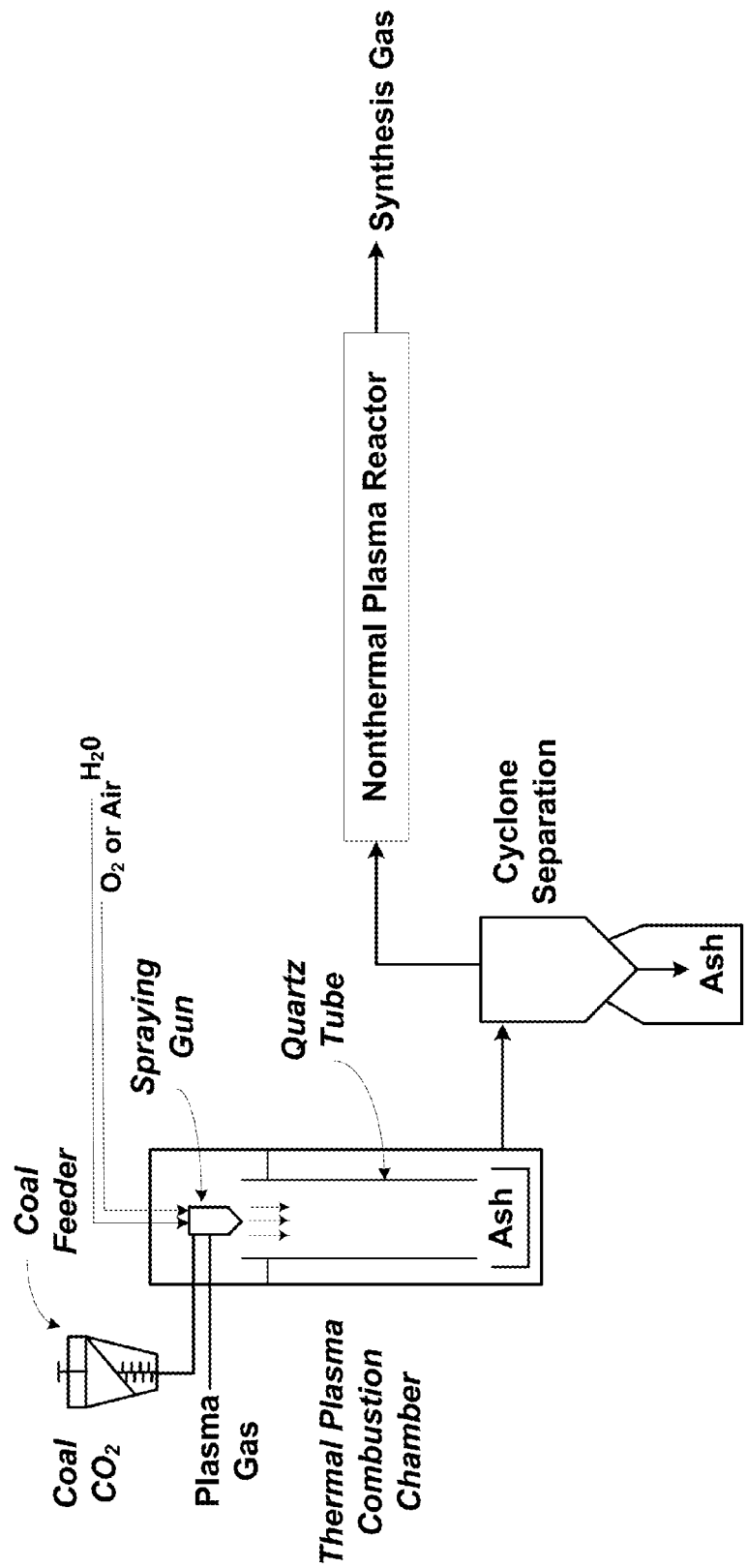
FIG. 2 illustrates a preferred configuration for syngas production for the process flow diagram provided in FIG. 1.

A more detailed illustration of the process described herein may be found in FIG. 2. Once again, the carbon source (preferably coal) along with $CO_2$ may be introduced into the thermal plasma combustion chamber. A plasma gas may be separately introduced which may be sourced from inert gas and/or air. The inert gases may include argon and/or nitrogen. Such plasma gases may preferably be configured to flow through electrodes within the spraying gun and exit at the tip of the nozzle. One may also separately introduce water vapor and oxygen via separate transfer lines and into separate nozzles that are positioned within the spraying gun. The relatively high temperature plasma gas stream will then react with the mixture of coal and reactant gases (air and/or oxygen) to produce a syngas (CO and $H_2$). It may therefore be appreciated that by adjustment of the water vapor introduced, the amount of $H_2$ ultimately produced may also be conveniently regulated. Accordingly, the volume flow of water vapor herein may preferably be in the range of 0.1-30.0%.

A thermal plasma reaction zone may be identified in the thermal plasma combustion chamber and will be related to the temperature and velocity fields of the plasma flow. The temperature of the center of the plasma may be as high as 10,000° C. More specifically, the temperature within the thermal plasma combustion chamber may be a gradient, wherein the temperature at the bottom of the chamber cools to about 200° C. Preferably, the temperature of the plasma may be in the range of 1000° C. to 1500° C. Such temperatures may be influenced by heat transfer from the plasma to the wall. During coal gasification herein, control of the energy flow density of the plasma flow, via use of a confined flow may offer additional advantages. Such confined plasma flow may be achieved by the introduction of a quartz tube (see FIG. 2) to the thermal plasma combustion chamber. Such confined flow has some of the following added benefits:

1) The flow is confined and does not spread radially and the plasma region becomes relatively longer.
2) The carbon material, which is treated by the thermal plasma flow, may now reside in the plasma for a relatively longer period of time and the heat exchange from the plasma to the carbon material may be more effective.
3) The plasma flow comes into contact with the wall of the quartz tube and the wall interaction may affect the reaction.

Accordingly, to further increase the residence time of the coal particles in the hot zone (the region of plasma formation), as noted a quartz column may preferably be placed below the plasma spray gun. This allows for a relatively more efficient process for the $CO_2$ conversion to CO and $H_2$ herein through the reaction of the coal in the thermal plasma combustion chamber. One example of a quartz column that may be employed herein includes a quartz column that has an inner diameter of 4.0-6.0 inches with a height of 25.0 to 35.0 inches.

It may also be noted that heat transfer from the plasma to coal particles is one of the factors that will affect the extent of conversion in the gasification reactor. In the thermal plasma gasifier, coal is preferably injected into thermal plasma with an angled trajectory to the plasma axis. For example, the coal trajectory may preferably be at an angle of 45-60 degrees with respect to the vertical axis of the plasma, as illustrated by the down-pointing arrows positioned under the spraying gun in FIG. 2.

Heat transfer from the hot plasma jet to cold coal particles is spatially dependent on the transport coefficients, e.g., viscosity ($\mu$), and thermal conductivity (k), and may be characterized herein by the Prandtl number (Pr), which is a dimensionless number, defined as the ratio of momentum diffusivity ($\nu$) and thermal diffusivity ($\alpha$):

$$Pr = \nu/\alpha = C_p \mu/k$$

where $C_p$ is specific heat (J/kg·K), $\mu$ is dynamic viscosity (Pa·s), k is thermal conductivity (W/m·K). Since $k_{plamsa} \ll k_{coal}$, there will be a uniform coal particle temperature and gradients in the plasma as coal particles are passing through the plasma, assuming there is no decomposition for the coal particles. However in practice, some coal decomposition is unavoidable.

Fourier's number (Fo) may b used herein for heat conduction characterization. $Fo = \alpha t/R^2$, where t is coal particle heating time, and R is coal particle radius. Accordingly, relatively small coal particles herein will experience relatively improved heat transfer from the plasma.

Since some of the chemical reactions of coal gasification are reversible at high temperature, to improve the yield of the products herein, removal of heat is preferred which maybe achieved via a "quenching" or cooling operation. To quench the reactions in the coal gasification, cooling water jackets may optionally be installed to cool the reaction zone or the thermal combustion chamber itself. Another benefit of cooling is to prevent the chamber wall from overheating. In addition, some gases can be used to quench the reaction such as the inert gas or even additional amounts of $CO_2$. Accordingly, unreacted $CO_2$ from coal gasification from a downstream operation or $CO_2$ from other sources may be employed to assist in quenching. To achieve zero-$CO_2$ emissions, $CO_2$ may be separated from the syngas produced herein and the coal reduction reactor effluent to re-feed to the plasma reactor and provide cooling.

As illustrated in FIG. 1 and FIG. 2, the output of the thermal plasma combustion chamber may optionally be fed to a cyclone separator for removal of ash and the gases may then be introduced to a nonthermal plasma reactor (NPR). The purpose of the NPR is to provide for further conversion of $CO_2$ to syn gas (CO) which may be achieved by a reverse water gas shift reaction:

$$CO_2 + H_2 \rightarrow CO + H_2O$$

The NPR herein may preferably generate a non-equilibrium relatively low temperature plasma through glow discharge. Accordingly the NPR herein is one which is not in thermodynamic equilibrium as the ion temperature is different from the electron temperature. That is, only the electrons attain the energy level typically found in the components of a typical thermal plasma. Therefore, the same type of reactions and oxidation that may normally take place at high temperature is possible at relatively lower temperatures. In the present disclosure, the voltage feed to the NPR is adjusted between 0-45 kV to provide a glow discharge.

The NPR herein may be preferably operated in the presence of water and an inert gas (e.g nitrogen) and CO may be produced due to the electron impact dissociation of $CO_2$. The possible reactions are therefore as follows:

(1) $CO_2$ dissociation in the presence of water. The $CO_2$ conversion in this path is relatively small. During the pulse discharge, CO is produced due to the electron (e) impact dissociation of $CO_2$. The possible reactions leading to CO and $H_2$ production are shown below, which may arise from the dissociation of $CO_2$ and water:

$$H_2O + e \leftrightarrow OH + H \rightarrow O + H_2$$

$$CO_2 + e \rightarrow CO + O$$

$$O + O \rightarrow O_2$$

(2) Reaction of $CO_2$ with an excited $N_2$ species. In a nonthermal plasma reactor at 200° C., extra CO can also be produced from the reaction of $CO_2$ with excited $N_2$ species, as observed in our experiments. The $CO_2$ conversion rate is less than 1%.

(3) The reduction of $CO_2$ with $H_2$. The $CO_2$ conversion rate is contemplated to be the highest for the identified three pathways. More specifically, experiments confirmed that 8.9% of $CO_2$ was converted to CO in a nonthermal plasma reactor at 200° C. in presence of $H_2$ without catalyst. The formation of CO is via the reverse water-gas shift reaction which is mildly endothermic, $\Delta H° = 41.2$ kJ/mol. One possible reason for relatively higher $CO_2$ conversion is the dissociation of $H_2O$ under plasma condition shifts the reaction to the right hand side, which favors the $CO_2$ conversion.

$$CO_2 + H_2 \rightarrow CO + H_2O$$

The competitive reaction, formation of $CH_4$ is via the following reaction:

$$CO_2 + 4H_2 \rightarrow CH_4 + 2H_2O$$

This reaction is moderately exothermic, $\Delta H° = -165$ kJ/mol. The $CH_4$ yield is generally below 1%. Since there is no driving force for further reduction of CO to $CH_4$, the $CO_2$ conversion in this path is relatively lower. With the further conversion of $CO_2$ in the presence of hydrogen, the $CO/H_2$ ratios may be adjusted to suite specific utilization of syngas for the downstream applications.

EXPERIMENTAL EXAMPLES

Test Setup for Coal Gasification

Figure 3:
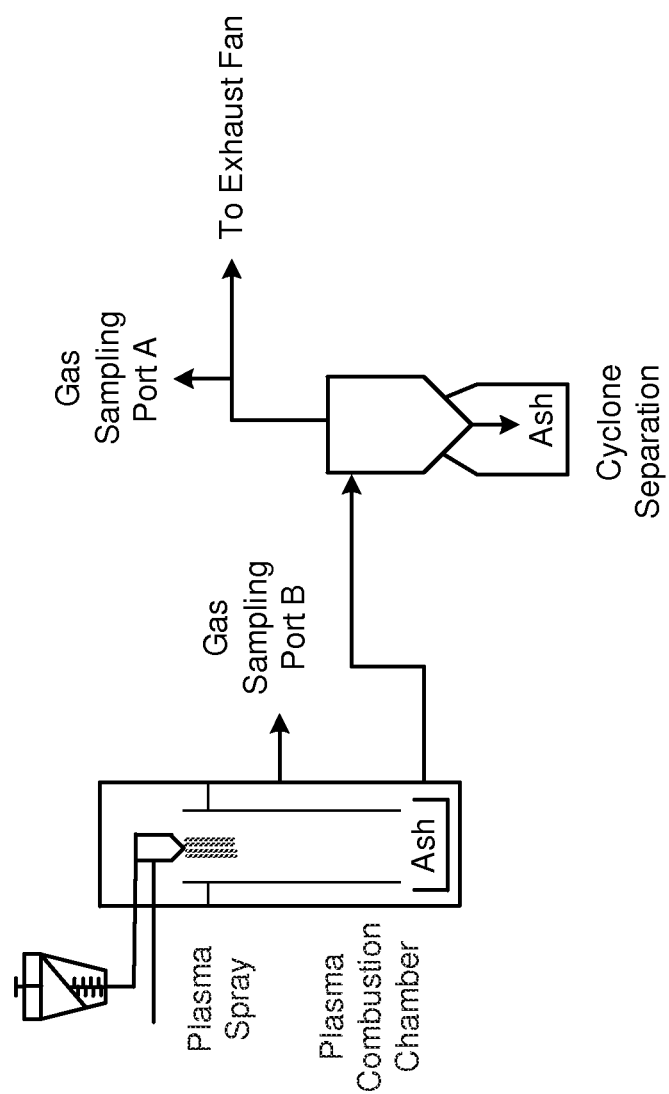
FIG. 3 illustrates the thermal plasma apparatus herein and two sampling ports: Sampling Port A and Sampling Port B.

During the gasification tests, argon gas was used as the plasma gas (working gas), which was flowing through inside the plasma spray gun to create a plasma jet stream down-flow into the reaction chamber. Argon was also used as a carrier gas for coal delivery. The reactant gas, air or $CO_2$, was fed though a separate nozzle along with the coal feed stream into the plasma reactor. Reactions occur within the plasma flame and within the subsequent reaction zone below the plasma flame in the quartz tube (4" O.D.×29" height). The total volume of the reaction chamber is approximately 212 liters. Gaseous species and part of the coal ash are vented from the lower outlet of the chamber to a solids separator cyclone, in which the coal ash was separated and discharged from the bottom of the cyclone. Another portion of coal ash and slag that is formed during the gasification and settled down to the bottom of the chamber. In other words, this settled ash did not make it into the cyclone. The gaseous product was analyzed using two GCs equipped with TCD and FID detectors, respectively. Analytical gas samples were collected at fixed time intervals. FIG. 3 depicts the thermal plasma gasification setup and two sampling ports: Sampling Port A and Sampling Port B.

Coal gasification products were then collected from reactions with various types of coals with air as the additional oxygen source for the comparison of reactions with $CO_2$ as the oxygen sources. The production of CO and $CO_2$ components were evaluated.

Using Air as the Oxygen Sources in the Presence of Water

1. Lignite Coal

Thermal plasma gasification of lignite coal with air (1 L/min) and water vapor (0.15 L/min) was tested. The electric current for the plasma gun was 500 A, and the electric voltage was 30 V. The air flow rate was 1 L/min, and the plasma gas pressure was 75 psi. Before air, water, and coal were introduced into the reactor, the thermal plasma was turned on to preheat the chamber so that the top chamber temperature reached 400° C., and the middle section (outside the quartz tube) was 250° C. Then coal was delivered into the chamber. The average coal delivery rate was 7.4 g/min during the 20-min test period.

Table 1 lists the analytical results for the gaseous samples taken from Sampling Port A. The highest $H_2$ concentration was 13.34% at 18-min reaction time and then decreased afterwards to 11.41%; at the same time, the highest CO concentration was 10.73%, and the $CO_2$ concentration was also at the highest point (0.50%).

TABLE 1

Analytical Results for Thermal Plasma Gasification of Lignite Coal with Air and Water at Sampling Port A

| Sampling time, min | $H_2$, vol. % | CO, vol. % | $CO_2$, vol. % |
|---|---|---|---|
| 0 | 0.00 | 0.23 | 0.17 |
| 2 | 0.00 | 0.65 | 0.27 |
| 4 | 0.00 | 0.75 | 0.43 |
| 6 | 1.68 | 0.77 | 0.38 |

TABLE 1-continued

Analytical Results for Thermal Plasma Gasification of
Lignite Coal with Air and Water at Sampling Port A

| Sampling time, min | $H_2$, vol. % | CO, vol. % | $CO_2$, vol. % |
|---|---|---|---|
| 10 | 8.23 | 5.89 | 0.38 |
| 12 | 7.98 | 4.69 | 0.36 |
| 14 | 4.13 | 2.92 | 0.33 |
| 16 | 8.33 | 6.47 | 0.44 |
| 18 | 13.34 | 10.73 | 0.50 |
| 20 | 11.41 | 7.74 | 0.33 |

2. Subbituminous Coal

Thermal plasma gasification of subbituminous coal with air and water vapor (3 vol. %) was also tested in this period. The electric current for the plasma gun was 500 A, and the electric voltage was 30 V. The air flow rate was 1 L/min, and the plasma gas pressure was 75 psi. Before air, water and coal were introduced into the reactor, the thermal plasma was turned on to preheat the chamber so that the top chamber temperature was 400° C., and the middle section (outside the quartz tube) was 250° C.

Table 2 lists the analytical results for the gaseous samples taken from Sampling Port A. The highest $H_2$ concentration was 13.1% at 4-min reaction time and then decreased afterwards; at the same time, the highest CO concentration was 10.9%, and the $CO_2$ concentration was also at the highest point (0.3%).

TABLE 2

Analytical Results for Thermal Plasma Gasification of Subbituminous
Coal with Air and Water at Sampling Port A

| Sampling time, min | $H_2$, vol. % | CO, vol. % | $CO_2$, vol. % |
|---|---|---|---|
| 0 | 0.00 | ND | 0.00 |
| 2 | 2.24 | 10.828 | 0.07 |
| 4 | 8.47 | 10.919 | 0.16 |
| 6 | 10.75 | 10.832 | 0.14 |
| 8 | 13.09 | 10.898 | 0.27 |
| 10 | 12.32 | 10.842 | 0.13 |
| 12 | 12.36 | 10.888 | 0.13 |
| 14 | 10.08 | 10.838 | 0.12 |
| 16 | 9.59 | 10.962 | 0.18 |
| 18 | 8.09 | 10.831 | 0.19 |
| 20 | 8.72 | 11.012 | 0.23 |

The temperature of the plasma gas may be controlled by the voltage applied to the electrodes in the plasma gun. The syngas yield form the coal gasification may be controlled by the temperature effects of the plasmas gas as demonstrated in the following experiments.

1. Subbituminous Coal in the Presence of Air and Water

Thermal plasma gasification of subbituminous coal with air was conducted. The electric current for the plasma gun was 650 A, and the electric voltage was 30 V. The air and $CO_2$ flow rate were both 1 L/min. Before air and coal were introduced into the reactor, the top section of the chamber temperature was 500° C., and it increased to 656° C. after the gasification proceeded for 20 minutes. The average coal delivery rate was 9.7 g/min.

Table 3 shows the analytical results for samples taken at Sampling Port A. For subbituminous coal gasification with air but without $CO_2$, CO and $H_2$ were produced with no $CO_2$ in the product. The $H_2$ concentrations changed between 15.37% and 10.40%; the CO concentration was at 11.59% at 10-min reaction time, and then decreased to 9.36% at 20-min reaction time. The fluctuation of the product gas concentrations might be from the unsteady coal delivery during the test.

TABLE 3

Analytical Results for Sampling Port A During Thermal Plasma
Gasification of Subbituminous Coal with Air (1 L/min)

| Sample ID | Sample Time (min) | $H_2$ conc. % | CO conc. % | $CO_2$ conc. % |
|---|---|---|---|---|
| A10 | 10 | 15.37 | 11.59 | 0 |
| A12 | 12 | 11.90 | 9.42 | 0 |
| A14 | 14 | 11.73 | 9.71 | 0 |
| A16 | 16 | 10.40 | 9.07 | 0 |
| A18 | 18 | 12.64 | 11.20 | 0 |
| A20 | 20 | 12.04 | 9.36 | 0 |

Using $CO_2$ as the Oxygen Sources

Background Data for the $CO_2$ Introduced to the Plasma Reactor without the Presence of Coal $CO_2$ was used as a delivery gas to replace argon flowing into the coal hopper. The $CO_2$ cylinder pressure was 75 psig, and the $CO_2$ flow rate measured with a flow meter was 5 L/min. To measure the $CO_2$ input from the coal delivery hopper, the argon plasma gas flow rate was the same as the coal gasification, and the gasification chamber was preheated to 500° C. with thermal plasma at 650 A and 30 V. After the system reached steady state (10 minutes from the $CO_2$ flow), samples were taken from Sampling Port B, and the analytical data shows that the average $CO_2$ concentration was 24.0 vol % as listed in Table 4.

TABLE 4

$CO_2$ Concentration Measured from Sampling
Port B with $CO_2$ Delivery Gas

| Sample Time (min) | $CO_2$ concentration (vol %) |
|---|---|
| 10 | 23.8 |
| 12 | 24.2 |
| 14 | 23.9 |
| Average | 24.0 |

Coal Gasification Using $CO_2$ as an Oxygen Source

1) Lignite

To study the temperature effect, $CO_2$ effect, and oxidant (air or oxygen) effect on coal gasification, different gasification conditions were tested for lignite coal gasification: electric current (350 A or 650 A), argon or $CO_2$ as the coal delivery gas, air or oxygen as oxidant for coal combustion.

A. Plasma at 350 A, with $CO_2$ as Delivery Gas

Thermal plasma gasification of lignite proceeded at 350 A, with $CO_2$ as delivery gas, and Table 5 lists the analytical results for the gaseous samples taken from Sampling Port B. The average $H_2$ concentration was 5.80% at the 10-20 minutes reaction time, the average CO concentration was 18.44%, $CO_2$ was 12.74%, and acetylene was 0.53%. The average coal delivery rate was 13.6 g/min.

TABLE 5

Analytical Results for Thermal Plasma Gasification of Lignite at 350 A with $CO_2$ Delivery Gas

| Sampling Time (min) | $H_2$, vol % | CO, vol % | $CO_2$, vol % | Acetylene, vol % |
|---|---|---|---|---|
| 10 | 5.85 | 18.32 | 12.63 | 0.52 |
| 12 | 4.76 | 17.81 | 13.38 | 0.40 |
| 14 | 4.90 | 17.05 | 13.67 | 0.52 |
| 16 | 6.20 | 19.04 | 12.32 | 0.61 |
| 18 | 6.44 | 19.51 | 11.92 | 0.62 |
| 20 | 6.65 | 18.92 | 12.54 | 0.49 |
| Average | 5.80 | 18.44 | 12.74 | 0.53 |

The $CO_2$ conversion rate calculation: $100 \times (24.0\% - 12.74\%)/24.0\% = 46.92\%$ B. Plasma at 650 A, with $CO_2$ as Delivery Gas Thermal plasma gasification of lignite proceeded at 650 A with $CO_2$ as the delivery gas, without oxidant. Table 6 lists the analytical results for the gaseous samples taken from Sampling Port B. The average $H_2$ concentration was 13.22% at the 10-20 minutes reaction time, the average CO concentration was 31.53%, $CO_2$ was 6.06%, and acetylene was 0.10%. The average coal delivery rate was 16.3 g/min.

TABLE 6

Analytical Results for Thermal Plasma Gasification of Lignite at 650 A, with $CO_2$ Delivery Gas

| Sampling Time (min) | $H_2$, vol % | CO, vol % | $CO_2$, vol % | Acetylene, vol % |
|---|---|---|---|---|
| 10 | 12.46 | 31.46 | 6.62 | 0.13 |
| 12 | 12.64 | 31.62 | 6.56 | 0.10 |
| 14 | 12.74 | 31.50 | 6.27 | 0.09 |
| 16 | 13.97 | 32.04 | 5.81 | 0.10 |
| 18 | 13.44 | 30.99 | 5.81 | 0.10 |
| 22 | 14.98 | 31.50 | 5.31 | 0.10 |
| 24 | 12.32 | 31.63 | 6.06 | |
| Average | 13.22 | 31.53 | 6.06 | 0.10 |

The $CO_2$ conversion rate was calculated as:

$$100 \times (24.0\% - 6.42\%)/24.0\% = 73.25\%$$

C. Plasma at 650 A, with $CO_2$ as Delivery Gas and Additional Air at 1 L/min. C.

Thermal plasma gasification of lignite proceeded at 650 A, with $CO_2$ as delivery gas and 1 L/min air flow. Table 7 lists the analytical results for the gaseous samples taken from Sampling Port B. The average $H_2$ concentration was 10.29% at the 10-20 minutes reaction time, the average CO concentration was 28.60%, $CO_2$ was 7.43%, and acetylene was 0.05%. The average coal delivery rate was 12.7 g/min.

TABLE 7

Analytical results for thermal plasma gasification of lignite at 650 A, with $CO_2$ as delivery gas and 1 L/min air flow

| Sampling Time (min) | $H_2$, vol % | CO, vol % | $CO_2$, vol % | Acetylene, vol % |
|---|---|---|---|---|
| 10 | 10.85 | 30.01 | 6.46 | 0.07 |
| 12 | 10.33 | 29.66 | 6.97 | 0.05 |
| 14 | 9.00 | 29.22 | 6.74 | 0.05 |
| 16 | 7.04 | 23.92 | 10.93 | 0.02 |
| 18 | 7.32 | 22.32 | 11.80 | 0.06 |
| 20 | 10.29 | 28.60 | 7.43 | 0.05 |

The $CO_2$ conversion rate was calculated as:

$$100 \times (24.0\% - 7.43\%)/24.0\% = 69.04\%$$

C. Plasma at 650 A, with $CO_2$ as Delivery Gas and Additional Air at 1 L/min

Thermal plasma gasification of subbituminous coal at 350 A with $CO_2$ as delivery gas was tested. Table 8 lists the analytical results for the gaseous samples taken from Sampling Port B. The average $H_2$ concentration was 5.67% at the 10-20 minutes reaction time, the average CO concentration was 20.01%, $CO_2$ was 11.48%, and acetylene was 0.26%. The average coal delivery rate was 13.6 g/min.

TABLE 8

Analytical Results for Thermal Plasma Gasification of Subbituminous Coal at 350 A, with $CO_2$ Delivery Gas

| Sampling Time (min) | $H_2$, vol % | CO, vol % | $CO_2$, vol % | Acetylene, vol % |
|---|---|---|---|---|
| 10 | 5.95 | 20.97 | 11.37 | 0.35 |
| 12 | 6.16 | 20.33 | 11.29 | 0.28 |
| 14 | 5.46 | 20.71 | 11.83 | 0.26 |
| 16 | 5.04 | 19.72 | 10.96 | 0.26 |
| 18 | 5.81 | 19.64 | 11.23 | 0.25 |
| 20 | 5.60 | 18.67 | 12.18 | 0.18 |
| Average | 5.67 | 20.01 | 11.48 | 0.26 |

The $CO_2$ conversion rate was calculated as:

$$100 \times (24.0\% - 11.48\%)/24.0\% = 52.17\%$$

2) Subbituminous Coal

A. Plasma at 650 A, with $CO_2$ as Delivery Gas

Thermal plasma gasification of subbituminous coal at 650 A was tested with $CO_2$ as delivery gas. Table 9 lists the analytical results for the gaseous samples taken from Sampling Port B. The average $H_2$ concentration was 14.33% at the 10-20 minutes reaction time, the average CO concentration was 30.43%, $CO_2$ was 5.46%, and acetylene was 0.12%. The average coal delivery rate was 14.8 g/min.

TABLE 9

Analytical Results for Thermal Plasma Gasification of Subbituminous Coal at 650 A, with $CO_2$ Delivery gas

| Sampling Time (min) | $H_2$, vol % | CO, vol % | $CO_2$, vol % | Acetylene, vol % |
|---|---|---|---|---|
| 10 | 15.23 | 31.33 | 5.18 | 0.16 |
| 12 | 14.53 | 31.18 | 5.47 | 0.11 |
| 14 | 10.50 | 29.56 | 6.40 | 0.06 |
| 16 | 14.84 | 30.03 | 5.59 | 0.14 |
| 18 | 15.54 | 30.80 | 4.99 | 0.13 |
| 20 | 15.33 | 29.67 | 5.16 | 0.13 |
| Average | 14.33 | 30.43 | 5.46 | 0.12 |

The $CO_2$ conversion rate was calculated as: $100 \times (24.0\% - 5.46\%)/24.0\% = 77.25\%$ B. Plasma at 650 A, with $CO_2$ as Delivery Gas and Additional Air at 1 L/min and 1 L/min Oxygen Flow Thermal plasma gasification of subbituminous coal at 650 A, with $CO_2$ as delivery gas and 1 L/min oxygen flow was tested. Table 10 lists the analytical results for the gaseous samples taken from Sampling Port B. The average $H_2$ concentration was 11.13% at the 10-20 minutes reaction time, the average CO concentration was 29.76%, $CO_2$ was 6.92%, and acetylene was 0.04%. The average coal delivery rate was 13.8 g/min.

TABLE 10

Analytical Results for Thermal Plasma Gasification of Subbituminous Coal at 650 A, with CO$_2$ Delivery Gas and 1 L/min oxygen flow

| Sampling Time (min) | H$_2$, vol % | CO, vol % | CO$_2$, vol % | Acetylene, vol % |
|---|---|---|---|---|
| 10 | 11.34 | 30.89 | 7.16 | 0.04 |
| 12 | 9.28 | 28.20 | 7.72 | 0.03 |
| 14 | 10.29 | 27.90 | 6.49 | 0.03 |
| 16 | 10.96 | 30.05 | 7.18 | 0.03 |
| 18 | 11.76 | 30.70 | 6.67 | 0.04 |
| 20 | 13.16 | 30.84 | 6.26 | 0.04 |
| Average | 11.13 | 29.76 | 6.92 | 0.04 |

The CO$_2$ conversion rate was calculated as: 100×(24.0%-6.92%)/24.0%=71.17%

Nonthermal Plasma for Additional CO$_2$ Conversion to Syngas

The nonthermal plasma reactor used herein was capable of generating a nonequilibrium, low-temperature plasma through glow discharge. Voltage is adjustable between 0-45 kV. It was found that voltage influenced the performance of the NTP reactor. At higher operating voltage, the glow discharge is relatively much stronger; however, some sparks were observed at 16.2 kV, and this indicates that the plasma generation was not stable.

Reaction of CO$_2$ (2 vol. %)+H$_2$O (1 vol. %)+N$_2$ (Dilute Gas) Stream in a Nonthermal Plasma Reactor In the experiment, 2 vol. % CO$_2$ and 1 vol. % water were fed into the NTP reactor with N$_2$ as dilute gas. At 15.3 kV, CO was produced in 200 ppm from FT-IR analysis. The CO$_2$ conversion was about 1 mol %.

Reaction of H$_2$ (30 vol %)+CO$_2$ (2 vol %)+N$_2$ (Dilute Gas) Stream in a Nonthermal Plasma Reactor During the NTP test of reaction of CO$_2$ with H$_2$, the volume % for CO$_2$ and H$_2$ were also 30 vol. % and 2 vol. %, respectively. The benefit of CO$_2$ conversion is to reduce the unreacted CO$_2$ from thermal plasma gasification, and to change the product distribution, because the CO/H$_2$ ratio will be higher. During the test, the preheater temperature was 550° C., and the NTP reactor temperature was 200° C. It was observed that without plasma, CH$_4$ was produced at 5 ppm, and CO was produced at 165 ppm. The formation of CO is via the reverse water-gas shift reaction which typically operates close to equilibrium, and is mildly endothermic, $\Delta H°=41.2$ kJ/mol.

Without plasma, this reaction is temperature dependent. At 450° C., the CO concentration was only 20 ppm; at 500° C., the CO concentration was about 80 ppm; at 550° C., the CO concentration was about 165 ppm (0.85 mol % CO$_2$ conversion). The stoichiometric reverse water-gas shift reaction which typically operates close to equilibrium, and is mildly endothermic, $\Delta H°=41.2$ kJ/mol. The formation of CH$_4$ is via the following reaction

CO$_2$+4H$_2$→CH$_4$+2H$_2$O

This reaction is moderately exothermic, $\Delta H°=-165$ kJ/mol. Without catalyst, the CH$_4$ yield was relatively much lower than that of CO.

After the nonthermal plasma was turned on, the CO production yield increased significantly, and the CO yield was affected by the voltage of the NTP reactor. When the NTP reactor voltage increased gradually from 4.5 kV to 7.5 kV, 12 kV, and 15.3 kV, the CO concentration in the reactor outlet increased from 625 ppm to 780 ppm, 840 ppm, and 1780 ppm. After the NTP reactor voltage increased from 15.3 kV to 16.2 kV, the CO concentration dropped quickly to 630 ppm, and then increased to 1080 ppm and stabilized at this concentration. This shows that 15.3 kV was the best operating voltage. At 16.2 kV, the quick drop of CO concentration was related to the unstable plasma discharge.

CO$_2$ conversion calculation: at 15.3 kV, the highest CO concentration was obtained. CO was produced in 1780 ppm from CO$_2$, and the initial CO$_2$ concentration was 2%. The highest CO$_2$ conversion rate is calculated as follows:

$$CO_2 \text{ conversion} = 100 \times \frac{(CO_2 \text{ concentration})}{(\text{initial } CO_2 \text{ concentration})}$$
$$= (1780 \times 10^{-6})/2\% = 8.9 \text{ mol \%}$$

The methane production rate is calculated as follows:

$$CH_4 \text{ conversion} = 100 \times \frac{(CH_4 \text{ concentration})}{(\text{initial } CO_2 \text{ concentration})}$$
$$= 100 \times (120 \times 10^{-6})/2\% = 0.6 \text{ mol \%}$$

The production of CH$_4$ was also associated with the operating voltage of the NTP reactor. Interestingly, the trend is opposite from the trend for the CO production. At the optimized operating voltage (15.3 kV), the CH$_4$ concentration was the lowest. One possible reason is that CH$_4$ is mainly produced from thermal reaction both in the preheater and the NTP reactor, rather than from the plasma reaction.

Temperature effect. When the temperature of the NTP reactor decreased from 200° C. to 100° C., at 15.3 kV, the amount of CO production decreased from 1780 ppm to 1340 ppm, and the amount of CH$_4$ production decreased sharply to 5 ppm. This strongly supported the assumption that CH$_4$ was produced from the thermal reaction, instead of plasma reaction.

Mechanism of CO produced from CO$_2$. The highest CO concentration obtained was 1780 ppm at 15.3 kV and 200° C. CO was generated either by direct electronic dissociation of CO$_2$ molecule from its ground state or from the anti-symmetric vibrational state of CO$_2$, which is an intermediary state of CO$_2$ dissociation as described in the following equation:

CO$_2$($\Sigma_u^+$)→CO(X$^1\Sigma^+$)+O

The hydrogen atom will react with O in the above equation to facilitate the production of CO. The formation of O via the above reactions is the control step at such input voltages. This is why the CO yield is relatively much higher with the presence of hydrogen.

The benefit of CO$_2$ conversion is to reduce the unreacted CO$_2$ from thermal plasma gasification, and to change the product distribution, because the CO/H$_2$ ratio is higher.

The results from the thermal plasma and NTP tests may be summarized as follows:

1. Thermal Plasma Tests

Thermal plasma gasification of lignite, subbituminous and bituminous coals with CO$_2$ as the delivery gas, air and/or O$_2$ was conducted at a thermal plasma flame of 650 A and 350 A. GC analyses showed that H$_2$, CO, and CO$_2$ were present in the gaseous products.
1) At 650 A, with the CO$_2$ as coal delivery gas, the highest CO$_2$ conversion rate for lignite, subbituminous, and bituminous coal was 73%, 77%, and 88%, respectively.
2) CO$_2$ conversion rate increased with the thermal plasma electric current.
3) Water vapor in the feed increased the H$_2$ concentration in the product.

2. NTP Tests:
1) NTP effect on the water-gas shift reaction (CO+ $H_2O \rightarrow CO_2+H_2$): The highest conversion rate for the reaction of CO with $H_2O$ was 0.34 mol % at 200° C. This implied that there was no significant change for CO and water.
2) The reaction of $CO_2$ with water and diluent gas $N_2$: The $CO_2$ conversion extent was ~1 mol %.
3) The reaction of $CO_2$ with hydrogen and diluent gas $N_2$: The highest conversion rate for $CO_2$ was 8.9 mol %, and 0.6 mol % of $CH_4$ was produced. It was also observed that, without NTP, the reaction of $CO_2$ and $H_2$ was extremely temperature dependent, and 0.85% of $CO_2$ conversion was obtained at 550° C. in the preheater.
4) The reaction CO with $H_2$: No significant reaction was observed for the reaction of CO with $H_2$ under NTP condition.
5) The reaction of $CO_2$ and water vapor with coal tar model compound indene under NTP condition. No indene was detected in the outlet of the NTP reactor, and no significant amount of CO was produced. Indene might react with the hydroxyl radicals generated from water. The observed products were not identified.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A process for carbon dioxide conversion comprising:
supplying a thermal plasma reactor;
introducing into said reactor a carbon based feedstock (C) and carbon dioxide ($CO_2$) wherein the thermal plasma reactor is at a temperature sufficient to convert the carbon based feedstock to carbon monoxide according to the following reaction:

$$C+CO_2 \rightleftarrows 2CO$$

wherein:
said carbon based feedstock is in the size range of 50 μm to 150 μm, said thermal plasma reactor provides a temperature gradient and said $CO_2$ is introduced into said reactor at a flow rate of 1.0 L/min to 10.0 L/min; and
said thermal plasma reactor generates output gases comprising CO and said output gases are introduced to a nonthermal plasma reactor.

2. The process of claim 1 wherein said temperature in said thermal plasma reactor is present as a gradient and is in the range of 200° C. to 10,000° C.

3. The process of claim 1 wherein water and air are introduced into said thermal plasma reactor and hydrogen ($H_2$) is produced in said thermal plasma reactor.

4. The process of claim 3 wherein the water is introduced into said thermal plasma reactor at a volume flow rate of 0.1-30.0%.

5. The process of claim 1 wherein said thermal plasma reactor includes a spraying gun which directs the plasma to define a plasma axis direction and said carbon based feedstock is introduced at an angle of 45-60 degrees with respect to said plasma axis direction.

6. The process of claim 1 wherein said carbon based feedstock comprises coal.

7. The process of claim 6 wherein said coal is one of lignite, subbituminous, bituminous, or anthracite coal.

8. The process of claim 1 wherein said carbon based feedstock is introduced into said thermal plasma reactor at a rate of 5.0 g/minute to 20 g/minute.

9. The process of claim 1 wherein said nonthermal plasma reactor provides conversion of carbon dioxide to carbon monoxide according to the equation:

$$CO_2+H_2 \rightarrow CO+H_2O.$$

10. A process for carbon dioxide conversion comprising:
supplying a thermal plasma reactor;
introducing into said reactor a carbon based feedstock (C) and carbon dioxide ($CO_2$) wherein the thermal plasma reactor is at a temperature sufficient to convert the carbon based feedstock to an output gas comprising carbon monoxide according to the following reaction:

$$C+CO_2 \rightleftarrows 2CO$$

wherein said carbon based feedstock is in the size range of 50 μm to 150 μm, said thermal plasma reactor provides a temperature gradient and said $CO_2$ is introduced into said reactor at a flow rate of 1.0 L/min to 10.0 L/min;
wherein said output gases are introduced to a nonthermal plasma reactor wherein said nonthermal plasma reactor provides conversion of carbon dioxide to carbon monoxide according to the equation:

$$CO_2+H_2 \rightarrow CO+H_2O; \text{ and}$$

wherein said thermal plasma reactor includes a quartz column.

11. The process of claim 10 wherein said temperature in said thermal plasma reactor is present as a gradient and is in the range of 200° C. to 10,000° C.

12. The process of claim 10 wherein water and air are introduced into said thermal plasma reactor and hydrogen ($H_2$) is produced in said thermal plasma reactor.

13. The process of claim 12 wherein the water is introduced into said thermal plasma reactor at a volume flow rate of 0.1-30.0%.

14. The process of claim 10 wherein said thermal plasma reactor includes a spraying gun which directs the plasma to define a plasma axis direction and said carbon based feedstock is introduced at an angle of 45-60 degrees with respect to said plasma axis direction.

15. The process of claim 10 wherein said carbon based feedstock comprises coal.

16. The process of claim 15 wherein said coal is one of lignite, subbituminous, bituminous, or anthracite coal.

17. The process of claim 10 wherein said carbon based feedstock is introduced into said thermal plasma reactor at a rate of 5.0 g/minute to 20 g/minute.

* * * * *

UNITED STATES PATENT AND TRADEMARK OFFICE
CERTIFICATE OF CORRECTION

PATENT NO. : 8,435,478 B2  
APPLICATION NO. : 13/015206  
DATED : May 7, 2013  
INVENTOR(S) : Maoqi Feng et al.

Page 1 of 1

It is certified that error appears in the above-identified patent and that said Letters Patent is hereby corrected as shown below:

In the Claims:

In column 13, line 39, in Claim 1, delete "C+CO2Σ2CO" and insert -- $C+CO_2 \rightleftharpoons 2CO$ --, therefor.

In column 14, line 23, in Claim 10, delete "C+CO2Σ2CO" and insert -- $C+CO_2 \rightleftharpoons 2CO$ --, therefor.

Signed and Sealed this
Eleventh Day of June, 2013

Teresa Stanek Rea
*Acting Director of the United States Patent and Trademark Office*